July 24, 1928.

E. J. KEARNEY 1,678,049

FLUID CONTROL DEVICE

Filed May 26, 1926

INVENTOR
Edward J Kearney
BY
Fred G Parsons
ATTORNEY

July 24, 1928.
E. J. KEARNEY
1,678,049
FLUID CONTROL DEVICE
Filed May 26, 1926   3 Sheets-Sheet 2
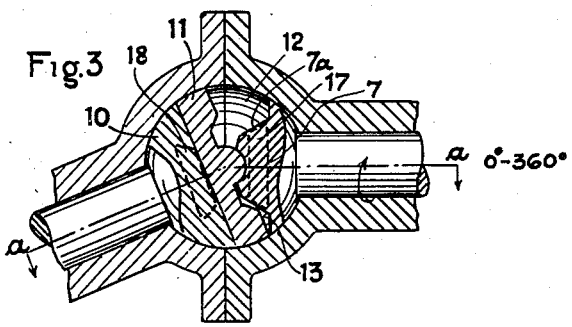
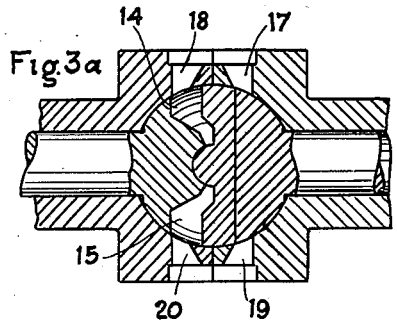
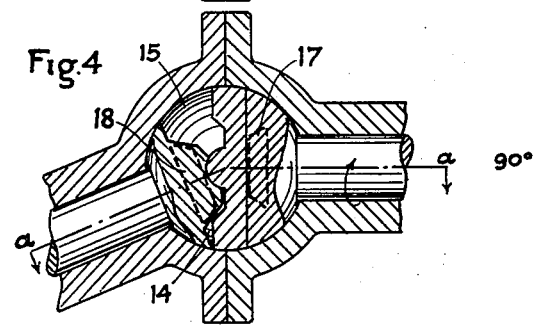
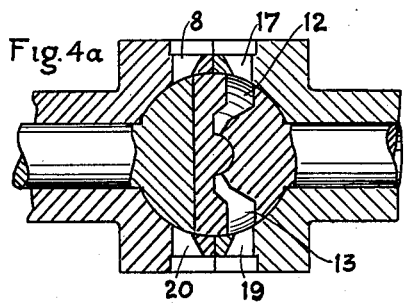
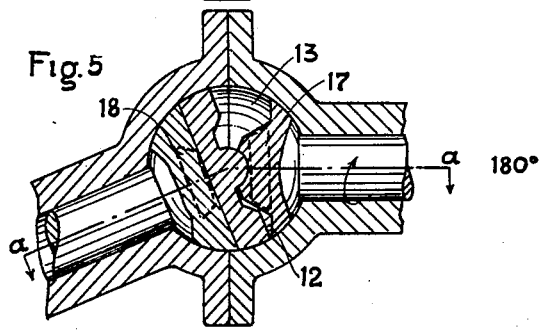
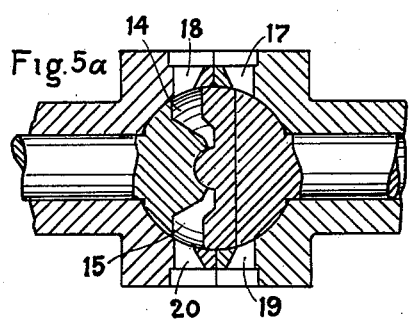
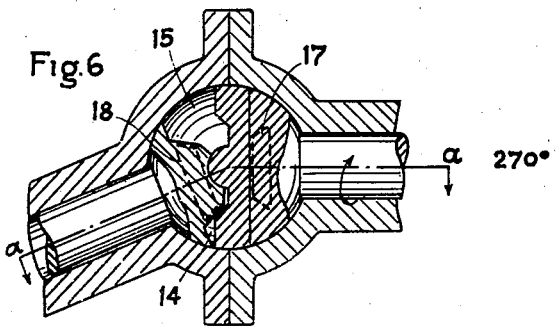
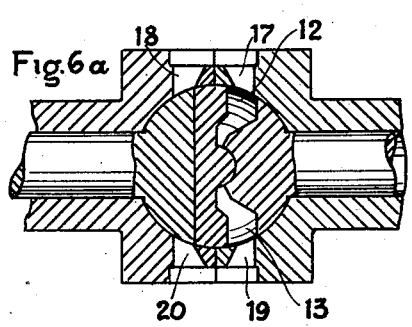
INVENTOR
Edward J Kearney
BY
Fred G Parsons
ATTORNEY July 24, 1928.

E. J. KEARNEY 1,678,049

FLUID CONTROL DEVICE

Filed May 26, 1926     3 Sheets-Sheet 3

VARIATION OF CHAMBER VOLUME IN 36°

INVENTOR
Edward J Kearney
BY
Fred G Parsons
ATTORNEY

Patented July 24, 1928.

1,678,049

UNITED STATES PATENT OFFICE.

EDWARD J. KEARNEY, OF WAUWATOSA, WISCONSIN, ASSIGNOR TO KEARNEY & TRECKER CORPORATION, OF WEST ALLIS, WISCONSIN.

FLUID-CONTROL DEVICE.

Application filed May 26, 1926. Serial No. 111,727.

This invention relates to fluid control devices such as pumps and motors and more particularly to improved means for obtaining automatically expanding and contracting chambers communicating at suitable intervals with intake and exhaust ports.

An object of the invention is to provide a fluid control device such as a pump or motor having a multiplicity of expanding and contracting chambers in improved closely organized relation whereby is obtained a fluid pump and motor of large capacity for the space occupied.

A further object is to provide a device in which an expanding and contracting chamber is put into communication with the proper intake and exhaust ports at the proper time without the use of auxiliary valve or port operating mechanism, the effect being obtained by an improved form, relationship and operation of parts.

A further purpose is to provide a fluid control device such as a pump or motor in which rotary movement is caused to automatically expand and contract a chamber without the intermediate agency of eccentrics or cranks.

Another object is to provide a fluid control device such as a pump or motor having a substantially uniform, non-pulsating flow of fluid, whether used as a pump for delivery of fluid under pressure, or used as a motor to receive fluid under pressure; this being particularly desirable when used in connection with the comparatively non-elastic fluids such as oil or water although also desirable when used in connection with elastic fluids such as air or other gas.

Another object is generally to improve and simplify the construction and operation of a device adapted to be used either as a fluid pump for the movement of fluid when power is applied to operate the device, or as a fluid motor from which power may be derived when fluid under pressure is suitably applied to actuate the device.

Other objects will be apparent from the accompanying drawings, description and claims.

The invention consists in certain novel features of construction and arrangement and in the combination of parts as hereinafter particularly described and claimed.

In the accompanying drawings, the same reference characters are used to designate the same parts in each of the several views.

Figure 2:
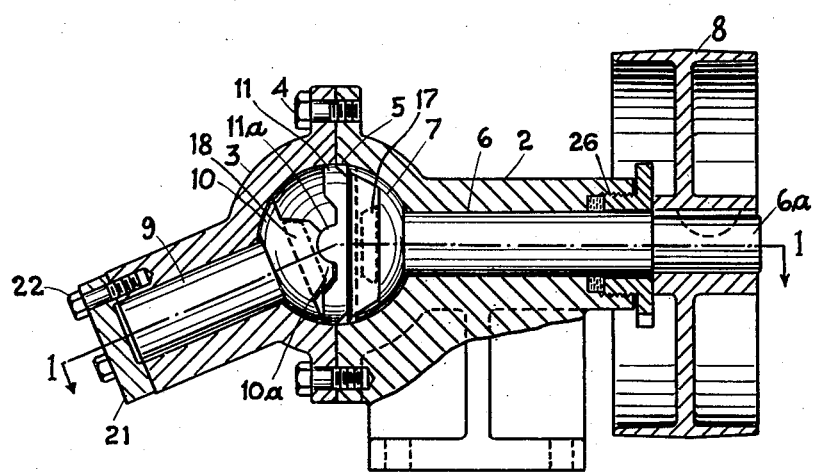
Fig. 2 is a section along line 2—2 of Fig. 1.

Figs. 3, 4, 5 and 6 are partial sections of the mechanism shown in Fig. 2 but in which the rotatable elements within the housing are successively at different positions of rotation 90 degrees apart, the movement being in the direction of the arrow and the position with reference to the positions shown in Fig. 3 representing 0°, 90°, 180°, and 270° of movement.

Figs. 3$^a$, 4$^a$, 5$^a$ and 6$^a$ are respectively transverse sections along the lines a—a of Figs. 3, 4, 5 and 6.

Figure 7:
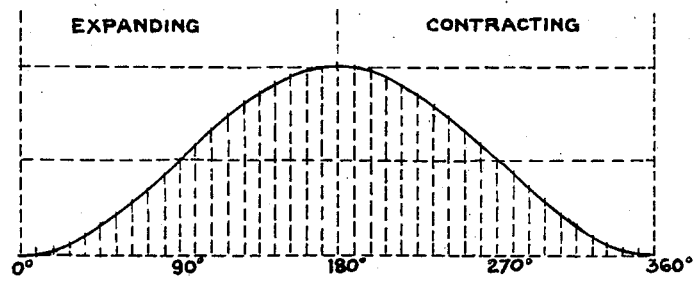
Figure 8:
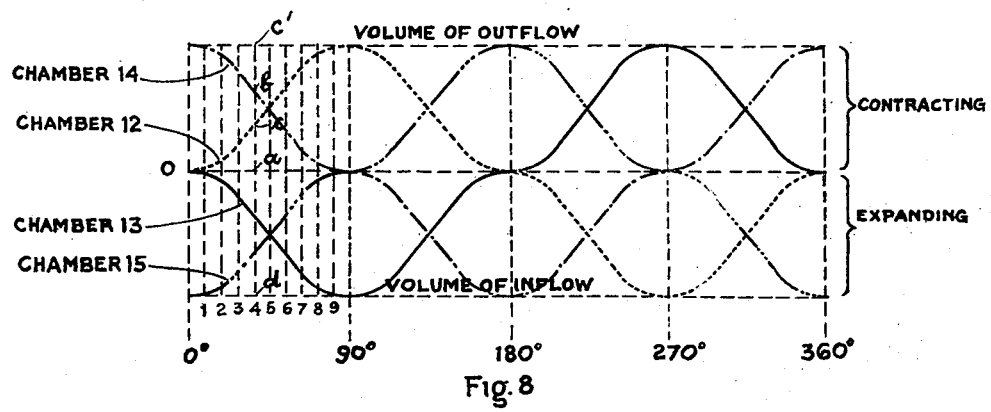

Figs. 7 and 8 are explanatory diagrams.

A case or housing generally denoted by the numeral 1, is for convenience of assembly constructed in two or more parts, in this instance the two parts or portions 2 and 3 secured together by bolts such as bolt 4. A main chamber 5 is provided within the housing and is of substantially spherical interior form.

A shaft 6 rotatably journaled in the housing has fixed upon or integrally formed with its one end a member 7 having surfaces in the direction toward shaft 6 which are complementary to and closely but rotatably fitted to the spherical interior surface of the chamber 5. End 6$^a$ of the shaft 6 projects outside housing 1 and carries a pulley 8 or other means of transmitting power either to or from the shaft 6. Another shaft 9 is rotatably journaled in the housing portion 3 and fixed upon or integral with shaft 9 is a member 10 having surfaces in the direction of shaft 9 closely but rotatably fitted to the spherical form of the chamber 5, the member 10 being similar to the member 7 but oppositely disposed. The axis of rotation of shaft 6 and member 7 coincides with an axis of the sphere complementary to the interior wall surface of the housing, and the axis of rotation of shaft 9 and member 10 coincides with a different axis of the sphere, the respective axes being located in a common plane but at an angle relative to one another and with the different axes of rotation intersecting at the center of the sphere.

An intermediate member 11 is pivoted for angular movement or oscillatory relative to the member 10 about an axis coinciding with one of the axes of the sphere complementary to the chamber 5, and vertical to the axis of rotation of member 10, by means of a portion 11ª socketed in a projecting portion 10ª of member 10 as is more particularly shown in Fig. 2. Member 11 is likewise pivoted for angular movement relative to member 7 about another axis of the sphere complementary to the chamber 5 and vertical both to the other axis of oscillatory or pivoted movement, and to the axis of rotation of member 7, by means of a projecting portion 11ᵇ socketed in projecting portion 7ª of the member 7. The peripheral surface of the member 11 is of spherical form complementary to the spherical interior surface of the chamber 5 in any position of the pivoted movement of the member about either of its axes of oscillatory and is closely but rotatably fitted therewith, whereby the member forms a partition for chamber 5 and in any of its positions divides the spherical chamber 5 into two nearly hemispherical chambers on opposite sides of the member.

Figure 1:
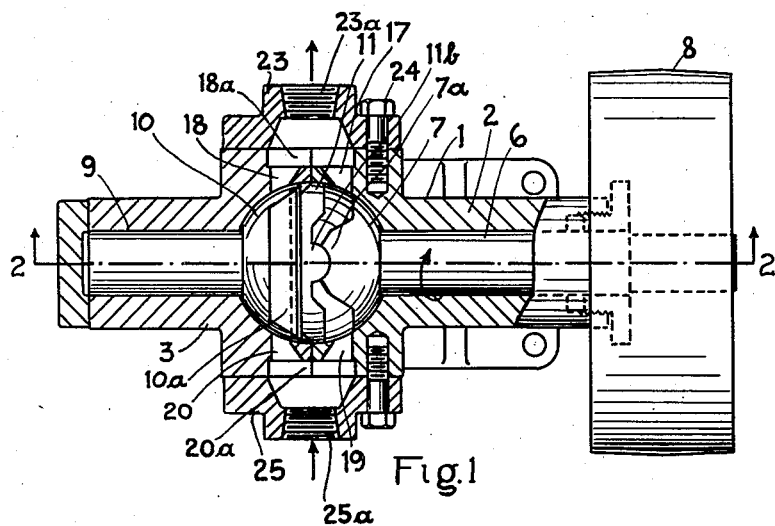
Fig. 1 is a plan view mainly in section along line 1—1 of Fig. 2, of a device in which this invention is incorporated.

The construction is such that the member 11 must revolve with the member 7 and shaft 6 as will be apparent from Fig. 1 and must likewise revolve with the member 10 and shaft 9 as will be apparent from Fig. 2, whereby the several members consisting of shaft 6, members 7, 11 and 10 and shaft 9 must all revolve together. The position of the parts at a certain point in their revolution, which may for the present purpose be considered a point of zero revolution, is shown in Figs. 3 and 3ª, Fig. 3ª being as previously explained a transverse section along line a—a of Fig. 3, showing the parts in the same position of revolution but from a view point 90° removed. It will be seen that the construction is such that four separate and distinct chambers are formed by the members 7, 11 and 10 and the housing 1, the chambers being denoted by the numerals 12, 13, 14 and 15. During the rotation of the members, the chambers 12, 13, 14 and 15 change greatly in volume, being alternately caused to expand and contract by reason of the different relative positions of the parts. In Fig. 3 for instance, the chamber 12 is in a position of maximum volume and chamber 13 is in a position of minimum volume while a reference to Fig. 3ª shows that chamber 14 is at the same time in a position of intermediate volume as is likewise the chamber 15. As the parts are revolved 90° from the position shown in Fig. 3 in the direction of the arrow to the position shown in Figs. 4 and 4ª, the chamber 12 has contracted to an intermediate volume and chamber 13 has expanded to an intermediate volume as shown in Fig. 4ª while the chamber 14 has contracted to a minimum volume and the chamber 15 has expanded to a maximum volume as shown in Fig. 4. As the parts are rotated from the position shown in Figs. 4 and 4ª through an angle of 90° in the direction of the arrow to the position shown in Figs. 5 and 5ª, it will be seen that the chamber 12 has contracted to a minimum volume, the chamber 13 has expanded to a maximum volume, the chamber 14 has expanded to intermediate volume and chamber 15 has contracted to intermediate volume.

As the parts are rotated from the position shown in Figs. 5 and 5ª through an angle of 90° in the direction of the arrow to the position shown in Figs. 6 and 6ª, the chambers 12 and 13 have respectively expanded and contracted to intermediate volume, the chamber 14 has contracted to minimum volume and chamber 15 has expanded to maximum volume. As the parts are rotated from the position shown in Figs. 6 and 6ª through an angle of 90° in the direction of the arrow to complete one revolution and to arrive again at the starting position shown in Figs. 3 and 3ª, it will be seen that the chamber 12 has expanded to maximum volume, the chamber 13 has contracted to minimum volume, the chamber 14 has expanded to an intermediate volume and chamber 15 has contracted to an intermediate volume. Thus it will be seen that during a single revolution of the rotatable elements each of the chambers 12, 13, 14 and 15 will pass through all the successive stages of expansion and contraction to maximum and minimum volume.

On the one side of the plane common to the axes of the shafts 6 and 9, are a plurality of ports or openings 17 and 18 and on the other side of the same plane are a plurality of ports or openings 19 and 20.

An inspection of the various figures will show that during the revolution of the parts in the direction of the arrows shown in the several views, the rotation of member 7 will cause port 17 to be closed away from the chamber 12 at the instant that the chamber reaches its maximum volume as shown in Fig. 3 and again when the chamber reaches its minimum volume as shown in Fig. 5. Owing to the position and form of port 17 and of the projecting portion 7ª of member 7, during the contraction of the chamber 12 from the maximum volume shown in Fig. 3 to the minimum volume shown in Fig. 5, the rotation of the parts causes the port 17 to be uncovered to communicate with the chamber, the uncovered area of the port gradually increasing from a minimum immediately following the position of rotation shown in Fig. 3 to a maximum uncovered area when the parts are in position shown in Fig. 4ª, from which position the uncovered area gradually diminishes until the port 17 is completely closed from chamber 12 when the chamber reaches the position of minimum volume as shown in Fig. 5. But immediately thereafter the port 19 is opened to the chamber 12 and remains in communication therewith until the chamber has passed through its movement of expansion and again reached the position shown in Fig. 3, at which time the chamber 12 is again closed from the port 19 and will immediately thereafter be again in communication with the port 17. Thus when the parts are revolved in the direction of the arrows the chamber 12 is at all times during its contraction, in communication with port 17 and at all times during its expansion in communication with port 19 and if fluid is supplied to the port 19, such fluid will be received into the chamber during chamber expansion and will thereafter be discharged through the port 17 during chamber contraction.

It is apparent that similarly the chamber 13 will also receive fluid from the port 19 and deliver it through port 17, the arrangement of chambers 12 and 13 being such that the one chamber is expanding and in communication with the supply port while the other is contracting and in communication with the delivery port. It is also apparent that the chambers 14 and 15 will similarly alternately receive fluid from the port 20 and deliver it to the port 18.

It has thus far been assumed for purposes of explanation that the rotation is in the direction of the arrows shown in Figs. 3, 4, 5 and 6, but if the direction of rotation is reversed the former periods of expansion and contraction are likewise reversed, whereby fluid supplied to the ports 17 and 18 is delivered to the ports 19 and 20, the flow of fluid thus corresponding to the direction of rotation of the parts.

If power is applied to the pulley 8 for rotation of the parts and fluid is supplied to the proper ports, fluid under pressure will be expelled from the other ports, the device then functioning as a pump, through which fluid may be moved in either direction according to the direction of rotation of the pulley.

If fluid under pressure is supplied to the proper ports the parts will be caused to rotate, discharging fluid from the other ports, and power may be drawn from pulley 8 to operate other mechanism, the device then functioning as a motor, which may be caused to rotate in either direction according to the choice of ports to which the fluid under pressure is supplied and since there is at all times at least one chamber in a position to receive fluid the device when used as a motor has no dead center.

Thus far nothing has been said of the rate at which the various alternately expanding and contracting chambers are caused to change in volume. It can be shown that, by the relationship of parts shown the rate of change is practically zero when the ports are closed to the chambers and reaches a maximum at a point half way between maximum and minimum chamber volume, and when the ports are fully open and least restrictive of fluid flow.

In Fig. 7 is shown a curve substantially corresponding to the variation in volume of the chamber 13 during the revolution of the parts as shown in Figs. 3, 4, 5 and 6 assuming a uniform angular velocity for the shaft 6. It is apparent that each of the other chambers will similarly expand and contract during any revolution of uniform angular velocity of shaft 6.

The construction is such that there are at all times two of the chambers expanding and two contracting. It can be shown that the rates of expansion and contraction are, by the arrangement of parts disclosed such that although the rate of fluid flow in or out of any particular chamber varies over a wide range, yet the movement of fluid through the device is at a substantially constant rate. The rate at which fluid will be delivered from and received by the combined chambers during a revolution of uniform angular velocity of shaft 6 from the position shown in Fig. 3, and in the direction of the arrows of Figs. 3, 4, 5, 6 is represented in Fig. 8 by the displacement of the different curved lines above or below the horizontal zero line, the displacement of a line below the horizontal zero line indicating an expanding or receptive condition of the chamber while a displacement of a line above the horizontal zero line indicates a contracting or expulsive condition of the chamber. The amount of such displacement is in Fig. 8 proportional to the rate at which fluid is entering or leaving the chamber at the various points of revolution, different points in the revolution being indicated by displacement of the line from left to right. It will be seen that from 0° to 180° chambers 13 and 15 are expanding and chambers 12 and 14 are contracting while from 180° to 360° chambers 12 and 14 are expanding while chambers 13 and 15 are contracting. At the instantaneous position shown in Figs. 3 and 3ª, which is represented by 0° of rotation, it will be seen that the chamber 14 is delivering at maximum volume, and chamber 12 has just changed from a condition of receiving to delivering of fluid. As the revolution proceeds to the 90° point shown in Figs. 4 and 4ª the volume of flow from chamber 14 diminishes but that from chamber 12 increases in the same degree to maintain a substantially constant volume of fluid movement. At the position coresponding to the vertical line marked 4, for instance, the volume of delivery from chamber 14 is represented by the distance $ab$ while the volume of flow from chamber 12 at the same point of revolution is represented by the distance $ac$, and the two together by the distance $ac'$, the distance $bc'$ being equal to the distance $ac$. It is apparent from the diagram that at any other point in the revolution the sum of the volume or rate of flow from the two contracting chambers is also substantially equal to the distance $ac'$. Similarly the combined volume or rate of flow to the two chambers 13 and 15 at the point of revolution marked 4 is equal to the distance $ad$, and at any other point in the revolution the combined rate of flow to the two expanding chambers is also substantially equal to the distance $ad$. It will also be apparent that the combined inflow and the combined outflow are at all times equal. Thus the fluid flow through the device is maintained at a substantially even rate equal to the maximum flow through any single chamber. The advantage of a constant fluid flow when the device is used as a pump is apparent, and when used as a motor it is also of great advantage for a variety of reasons, among which it may be mentioned that, being in a condition to receive a constant flow of fluid in any position, there is no dead center, nor any position in which the parts may come to rest, in which the starting torque is substantially less than in other positions.

In the foregoing explanation of the action of the device, it has been assumed for convenience that the fluid is substantially incompressible, as for instance a liquid. It has also been assumed for convenience that a uniform angular velocity of the members 7 results in a uniform angular velocity of the members 10 and 11. Owing to the angularity of shafts 6 and 9 this is strictly true only at four points spaced 90° apart in the revolution of the members, but for shaft angularity of the amount shown in the drawings or less, the variation of members 10 and 11 from uniform angular velocity is negligible, and in the operation of the device it appears that any difference caused thereby in the rate of flow through one of the chambers is probably compensated by an equal but opposite variation in another chamber.

The opening into the chamber 5 to permit entry of shaft 9 is effectually sealed by providing a close fitting cover plate 21 fastened by the means of screws or bolts such as bolt 22 and where the shaft 6 projects from the housing packing means of well known form is provided as at 22. Thus the housing is effectually sealed against passage of fluid except where ports are provided for the purpose explained. The ports 17 and 18, being always of like purpose whether to deliver or to receive fluid, both communicate into a single port $18^a$ and into a suitable passageway in a fitting or member 23 closely fitted to the housing and held in place by suitable bolts such as bolt 24. The ports 19 and 20 being always of like purpose both communicate into a single port $20^a$ and into a suitable passageway in a fitting or member 25 similarly fixed on the housing. The fittings 23 and 25 are provided with threaded bores $23^a$ and $25^a$ for the purpose of receiving pipes adapted to receive and deliver fluid.

It will be noted that the members 7 and 10 are free for axial movement away from the oscillatory member 11, there being no pivot pins connecting the members. Such movement is limited by the thrusts set up by the ing surface, and the thrusts set up by the oscillatory movement tend to move the adjacent surfaces of members 7 and 10 and the housing into close relation. This is of particular advantage in that it effectually prevents leakage from the one port to the other between such adjacent surfaces.

It has been found that the device should be constructed so that the angle formed between the intersecting axes of members 7 and 10 is substantially less than 45 degrees. An angle of 45 degrees sets up enormous friction losses between the members 7, 10 and 11, and very heavy thrusts between the adjacent member and housing surfaces, causing rapid wear and consequent leakage. Any leakage constitutes a power loss and even with an angle substantially less than 45 degrees, it has been found to be a material improvement to split the housing along a line transverse to the intersecting axes of members 7 and 10. By such construction a predetermined amount of material may be removed from the adjacent surfaces of the separable housing members to compensate for wear between the moving members or for original fitting of the parts to avoid leakage. An angle less than 45 degrees also permits material improvement in the matter of arranging the ports for ample fluid capacity to avoid power loss and to be opened and closed by the revolution of the members, and in providing improved strength and rigidity in the oscillating member and improved pivots for the oscillating movements.

It will be apparent that in the light of this disclosure a variety of modified but equivalent structures may be constructed by those familiar with the art, each of which it is desired to reserve to the inventor by Letters Patent if within the spirit and scope of the following claims.

I claim:

1. A device of the nature disclosed comprising a housing having interior wall surface portions substantially corresponding to surface portions of a sphere, a plurality of members rotatable therein about different axes in a common plane and intersecting at the center of said sphere, a member positioned between the other members for rotation therewith and pivoted for oscillation relative thereto about different axes respectively and intersecting at the center of said sphere; whereby chambers are formed within said housing and alternately expanding and contracting during rotation of said members, said housing providing ports respectively positioned on opposite sides of said plane and said members being formed to close the one port from the other, said other members being free for axial movement away from the intermediate member whereby thrusts set up by the oscillatory movement thereof may cause adjacent surfaces of said other members and the interior housing wall to fit closely together during rotation to substantially prevent fluid leakage from one to the other of said ports between said adjacent surfaces, the intersecting axes of said other members forming an angle substantially less than 45 degrees whereby to limit the pressure between said adjacent surfaces.

2. A device of the nature disclosed comprising a housing having interior wall surfaces substantially corresponding to surface portions of a sphere, a plurality of members rotatable therein about different axes intersecting at the center of said sphere, a member positioned between the other members for rotation therewith and pivoted therewith for oscillation about different axes respectively and intersecting at the center of said sphere, whereby chambers are formed within said housing and alternately expanding and contracting during rotation of said members, said housing providing inlet and outlet ports for said chambers and spaced apart, said other members being free for axial movement away from said intermediate member whereby thrusts set up during oscillatory movement of the intermediate member may cause adjacent surfaces of other members and the interior wall of said housing to fit closely together during operation to substantially prevent passage of fluid from one to the other of said ports between said adjacent surfaces.

3. A device of the nature disclosed comprising a housing having interior wall surface portions substantially corresponding to surface portions of a sphere, a plurality of members spaced apart and rotatable in said housing about different axes intersecting at the center of said sphere, an intermediate member rotatable in said housing and pivoted with the other members for oscillation relative thereto about different axes respectively vertical to the axes of the respective other members and intersecting at the center of said sphere, whereby a plurality of chambers are formed and alternately expanding and contracting during rotation of said members, said other members constituting thrust elements for the oscillation of said intermediate member, and one of the angles formed by the intersecting axes of said other members being substantially less than 45 degrees, whereby to limit such thrust.

4. A device of the nature disclosed comprising a housing having interior wall surface portions substantially corresponding to surface portions of a sphere, a plurality of members spaced apart and rotatable in said housing about different axes in a common plane and intersecting at the center of said sphere to form angles one of which is substantially less than 45 degrees, a member disposed between said other members for rotation and pivoted therewith for oscillation about different axes respectively and intersecting at the center of said sphere, whereby chambers are formed within said housing and alternately expanding and contracting during rotation of said members, said housing providing port openings respectively on opposite sides of said plane, and said members being formed to alternately cover and uncover each of said port openings during rotation.

5. A device of the nature disclosed comprising a housing having interior wall surfaces complementary to the surface of a sphere, a plurality of members spaced apart and rotatable within said housing about different axes, a member positioned between the other members for rotation therewith and pivoted for oscillation relative thereto about different axes respectively and intersecting at the center of said sphere, whereby chambers are formed within said housing and alternately expanding and contracting during rotation, said members being free for relative movement along the axes of rotation, and said housing constituting means limiting such axial movement.

6. A device of the nature disclosed comprising a housing providing a spherical chamber, a plurality of members spaced apart within said chamber and supported from said housing for rotation about different axes respectively and fixed in relation thereto, a third member between the other members and oscillatable relative thereto about different axes respectively; whereby a plurality of chambers are formed within said housing and alternately expanding and contracting during rotation of said members, said housing comprising a plurality of members separately joined along surfaces substantially vertical to the axis of rotation of one of said other members.

7. A device of the nature disclosed comprising a housing, a plurality of parts spaced apart for rotation therein respectively about different axes intersecting in a common plane, a part rotatably positioned between the other parts and oscillatable relative thereto about different axes respectively; whereby chambers alternately expanding and contracting are formed within said housing during rotation of said parts, said housing providing ports respectively on opposite sides of said plane and alternately brought into communication with said chambers by the rotation of said parts, said plurality of parts being axially movable away from the oscillatory part and said housing providing surfaces adjacent surfaces of said other parts to limit such axial movement, whereby the thrusts set up by the oscillation of the one part moves said adjacent surfaces closely together to avoid leakage of fluid from the one port to the other between said adjacent surfaces, said intersecting axes forming an angle substantially less than 45 degrees whereby to limit said thrusts, and said housing comprising a plurality of members separately joined along surfaces transverse to both said intersecting axes whereby to provide means for adjustment compensating for wear of said adjacent surfaces.

In witness whereof I hereto affix my signature.

EDWARD J. KEARNEY.